United States Patent
Wei et al.

(10) Patent No.: US 11,116,001 B2
(45) Date of Patent: Sep. 7, 2021

(54) TECHNIQUES AND APPARATUSES FOR SUB-PHYSICAL RESOURCE BLOCK RESOURCE ALLOCATION FOR MACHINE TYPE COMMUNICATION

(71) Applicants: QUALCOMM Incorporated, San Diego, CA (US); Chao Wei, Beijing (CN); Kapil Bhattad, Bangalore (IN); Alberto Rico Alvarino, San Diego, CA (US)

(72) Inventors: Chao Wei, Beijing (CN); Kapil Bhattad, Bangalore (IN); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/603,736

(22) PCT Filed: May 9, 2018

(86) PCT No.: PCT/CN2018/086164
§ 371 (c)(1),
(2) Date: Oct. 8, 2019

(87) PCT Pub. No.: WO2018/210170
PCT Pub. Date: Nov. 22, 2018

(65) Prior Publication Data
US 2021/0100023 A1    Apr. 1, 2021

(30) Foreign Application Priority Data

May 16, 2017    (WO) ................ PCT/CN2017/084454

(51) Int. Cl.
*H04W 72/14*    (2009.01)
*H04W 4/70*    (2018.01)

(52) U.S. Cl.
CPC ............. *H04W 72/14* (2013.01); *H04W 4/70* (2018.02)

(58) Field of Classification Search
CPC . H04W 72/042; H04W 4/70; H04W 72/0446; H04W 72/0453; H04W 24/10;
(Continued)

(56) References Cited

U.S. PATENT DOCUMENTS

2014/0126497 A1    5/2014  Xu et al.
2016/0088594 A1*   3/2016  Xiong ................ H04W 4/70
                                           370/329
(Continued)

FOREIGN PATENT DOCUMENTS

CN    104205979 A    12/2014
CN    106664517 A    5/2017
(Continued)

OTHER PUBLICATIONS

International Search Report and Written Opinion—PCT/CN2017/084454—ISA/EPO—dated Feb. 7, 2018.
(Continued)

*Primary Examiner* — Kwasi Karikari
(74) *Attorney, Agent, or Firm* — Qualcomm Incorporated

(57) ABSTRACT

A method, a user equipment, an apparatus, and a computer program product for wireless communication are provided. The apparatus may receive a grant identifying an uplink resource allocation of less than one physical resource block (PRB), wherein the grant identifies a particular PRB in which the uplink resource allocation is included and at least
(Continued)

a group of subcarriers allocated for the apparatus; and transmit uplink data using the uplink resource allocation. Numerous other aspects are described.

30 Claims, 10 Drawing Sheets

(58) Field of Classification Search
CPC ... H04W 56/001; H04W 68/02; H04W 48/12; H04W 72/04; H04W 72/0406; H04W 72/0413; H04W 72/1289; H04W 74/006; H04W 76/27; H04L 5/0048; H04L 5/001; H04L 5/0094; H04L 5/0044; H04L 5/0092; H04L 5/0005; H04L 5/0023; H04L 5/003; H04L 5/0012
See application file for complete search history.

(56) References Cited

U.S. PATENT DOCUMENTS

| | | | | |
|---|---|---|---|---|
| 2016/0302174 | A1* | 10/2016 | Chatterjee | H04W 72/06 |
| 2017/0078830 | A1 | 3/2017 | Wu et al. | |
| 2017/0290016 | A1* | 10/2017 | Yi | H04L 5/0053 |
| 2018/0049080 | A1* | 2/2018 | Zhang | H04W 36/0088 |

FOREIGN PATENT DOCUMENTS

| | | |
|---|---|---|
| WO | 2016064218 A2 | 4/2016 |
| WO | 2016070838 A1 | 5/2016 |
| WO | 2016099057 A1 | 6/2016 |
| WO | 2016161630 A1 | 10/2016 |

OTHER PUBLICATIONS

International Search Report and Written Opinion—PCT/CN2018/086164 —ISA/EPO—dated Jul. 27, 2018.
ZTE et al., "Support of Increased PUSCH Spectral Efficiency for MTC", 3GPP TSG RAN WG1 Meeting #88bis R1-1705486, Apr. 7, 2017, 3 pages.
European Search Report—EP20190557—Search Authority—The Hague—dated Oct. 30, 2020.
Huawei, et al., "PUSCH for MTC and Coverage Enhancement", 3GPP TSG RAN WG1 Meeting #82, 3GPP Draft; R1-153759, 3rd Generation Partnership Project (3GPP), Mobile Competence Centre ; 650, Route Des Lucioles; F-06921 Sophia-Antipolis Cedex ; France, vol. RAN WG1, No. Beijing, China; Aug. 24, 2015-Aug. 28, 2015 Aug. 23, 2015 (Aug. 23, 2015), XP051001207, Retrieved from the Internet: URL: http://www.3gpp.org/ftp/Meetings_3GPP_SYNC/RAN1/Docs/ (retrieved on Aug. 23, 2015], Section 4, p. 3.
Sierra Wireless: "Frequency Hopping with and without Sub-PRB Transmission for PUSCH Coverage Enhancement", 3GPP TSG-RAN WG1 Meeting 80-BIS, 3GPP Draft; R1-151475, FH and Sub PRB V2, 3rd Generation Partnership Project (3GPP), Mobile Competence Centre; 650, Route Des Lucioles; F-06921 Sophia-Antipolis Cedex; France, vol. RAN WG1, No. Belgrade; Apr. 20, 2015-Apr. 24, 2015, Apr. 19, 2015 (Apr. 19, 2015), 2 Pages, XP050934347, Retrieved from the Internet: URL: http://www.3gpp.org/ftp/Meetings_3GPP_SYNC/RAN1/Docs/ [retrieved on Apr. 19, 2015].
Supplementary European Search Report—EP18801928—Search Authority—The Hague—dated Oct. 30, 2020.

* cited by examiner

TECHNIQUES AND APPARATUSES FOR SUB-PHYSICAL RESOURCE BLOCK RESOURCE ALLOCATION FOR MACHINE TYPE COMMUNICATION

CROSS-REFERENCE TO RELATED APPLICATIONS

This application is a 371 national stage of PCT Application No. PCT/CN2018/086164 filed on May 9, 2018, entitled "TECHNIQUES AND APPARATUSES FOR SUB-PHYSICAL RESOURCE BLOCK RESOURCE ALLOCATION FOR MACHINE TYPE COMMUNICATION," which claims priority to PCT Application No. PCT/CN2017/084454 filed on May 16, 2017, entitled "TECHNIQUES AND APPARATUSES FOR SUB-PHYSICAL RESOURCE BLOCK RESOURCE ALLOCATION FOR MACHINE TYPE COMMUNICATION," all of which are incorporated by reference herein.

BACKGROUND

Technical Field of the Disclosure

Aspects of the present disclosure generally relate to wireless communication, and more particularly to techniques and apparatuses for sub-physical resource block (PRB) resource allocation for machine type communication (MTC). Some techniques and apparatuses described herein enable and provide wireless communication devices and systems configured for increased efficiency of resource allocation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In an aspect of the disclosure, a method, an apparatus, and a computer program product are provided.

In some aspects, the method may include receiving, by a UE, a grant identifying an uplink resource allocation of less than one PRB, wherein the grant identifies a particular PRB in which the uplink resource allocation is included and at least a group of subcarriers allocated for the UE; and/or transmitting uplink data, by the UE, using the uplink resource allocation.

In some aspects, the apparatus may include a memory and at least one processor operatively coupled to the memory. The memory and the at least one processor may be configured to receive a grant identifying an uplink resource allocation of less than one PRB, wherein the grant identifies a particular PRB in which the uplink resource allocation is included and at least a group of subcarriers allocated for the apparatus; and/or transmit uplink data using the uplink resource allocation.

In some aspects, the apparatus may include means for receiving a grant identifying an uplink resource allocation of less than one PRB, wherein the grant identifies a particular PRB in which the uplink resource allocation is included and at least a group of subcarriers allocated for the apparatus; and/or means for transmitting uplink data using the uplink resource allocation.

In some aspects, the computer program product may include a non-transitory computer-readable medium storing computer executable code. The code may include code for receiving a grant identifying an uplink resource allocation of less than one PRB, wherein the grant identifies a particular PRB in which the uplink resource allocation is included and at least a group of subcarriers allocated for a UE; and/or code for transmitting uplink data using the uplink resource allocation.

In some aspects, the method may include receiving, by a UE, a grant identifying an uplink resource allocation of less than one PRB, wherein the grant identifies a number of subframes or resource units to which a transport block, associated with the uplink resource allocation, is to be mapped; and/or determining, by the UE, a frequency hopping technique based at least in part on the number of subframes or resource units.

In some aspects, the apparatus may include a memory and at least one processor operatively coupled to the memory. The memory and the at least one processor may be configured to receive a grant identifying an uplink resource allocation of less than one PRB, wherein the grant identifies a number of subframes or resource units to which a transport block, associated with the uplink resource allocation, is to be mapped; and/or determine a frequency hopping technique based at least in part on the number of subframes or resource units.

In some aspects, the apparatus may include means for receiving a grant identifying an uplink resource allocation of less than one PRB, wherein the grant identifies a number of subframes or resource units to which a transport block, associated with the uplink resource allocation, is to be mapped; and/or means for determining a frequency hopping technique based at least in part on the number of subframes or resource units.

In some aspects, the computer program product may include a non-transitory computer-readable medium storing computer executable code. The code may include code for receiving a grant identifying an uplink resource allocation of less than one PRB, wherein the grant identifies a number of subframes or resource units to which a transport block, associated with the uplink resource allocation, is to be mapped; and/or code for determining a frequency hopping technique based at least in part on the number of subframes or resource units.

In some aspects, the method may include receiving, by a UE, a grant identifying an uplink resource allocation of less than one PRB; and/or performing, by the UE, a retuning operation based at least in part on the grant identifying an uplink resource allocation of less than one PRB.

In some aspects, the apparatus may include a memory and at least one processor operatively coupled to the memory. The memory and the at least one processor may be configured to receive a grant identifying an uplink resource allocation of less than one PRB; and/or perform a retuning operation based at least in part on the grant identifying an uplink resource allocation of less than one PRB.

In some aspects, the apparatus may include means for receiving a grant identifying an uplink resource allocation of less than one PRB; and/or means for performing a retuning operation based at least in part on the grant identifying an uplink resource allocation of less than one PRB.

In some aspects, the computer program product may include a non-transitory computer-readable medium storing computer executable code. The code may include code for receiving a grant identifying an uplink resource allocation of less than one PRB; and/or code for performing a retuning operation based at least in part on the grant identifying an uplink resource allocation of less than one PRB.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
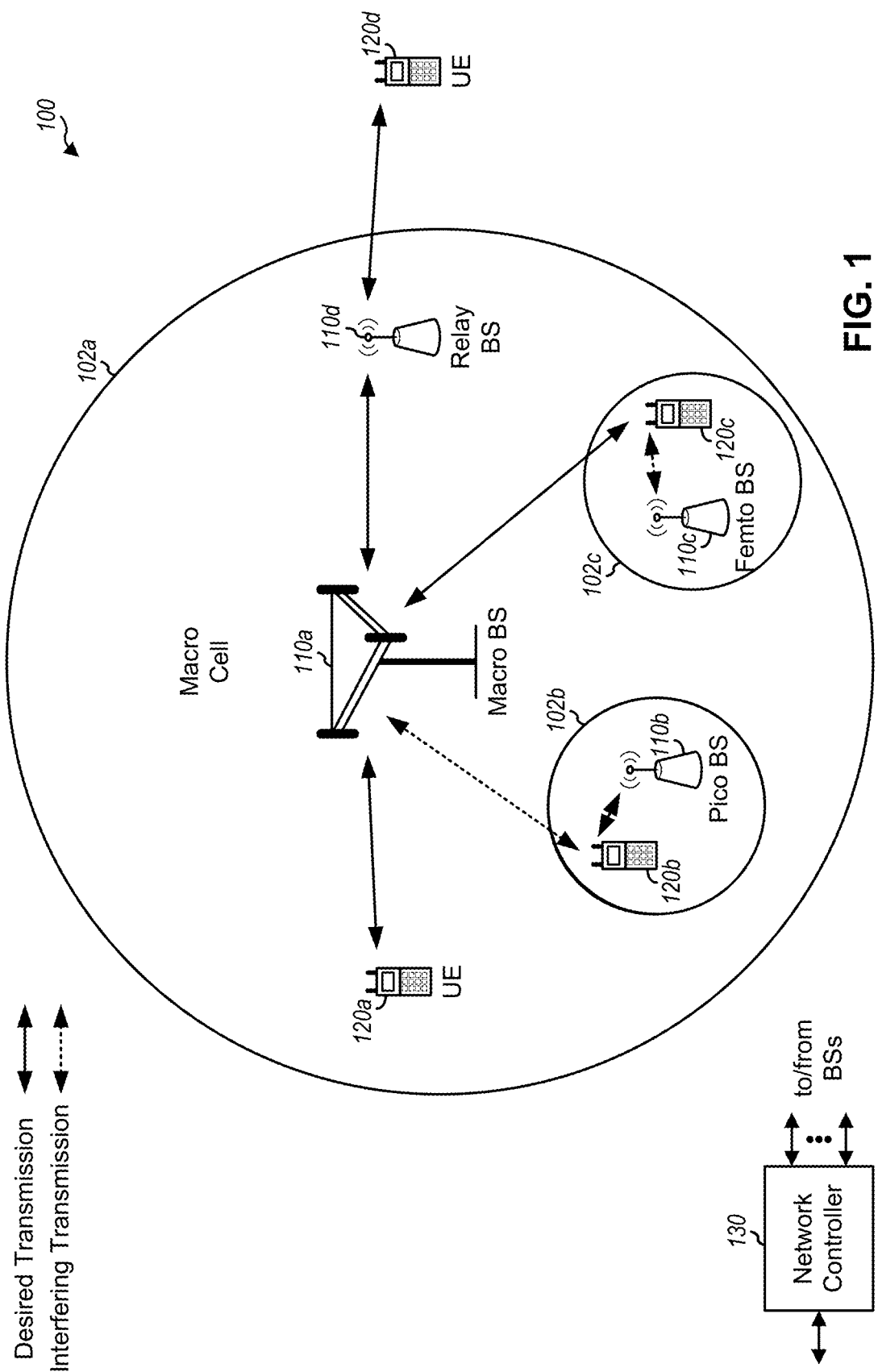
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), a wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, artificial-intelligence-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
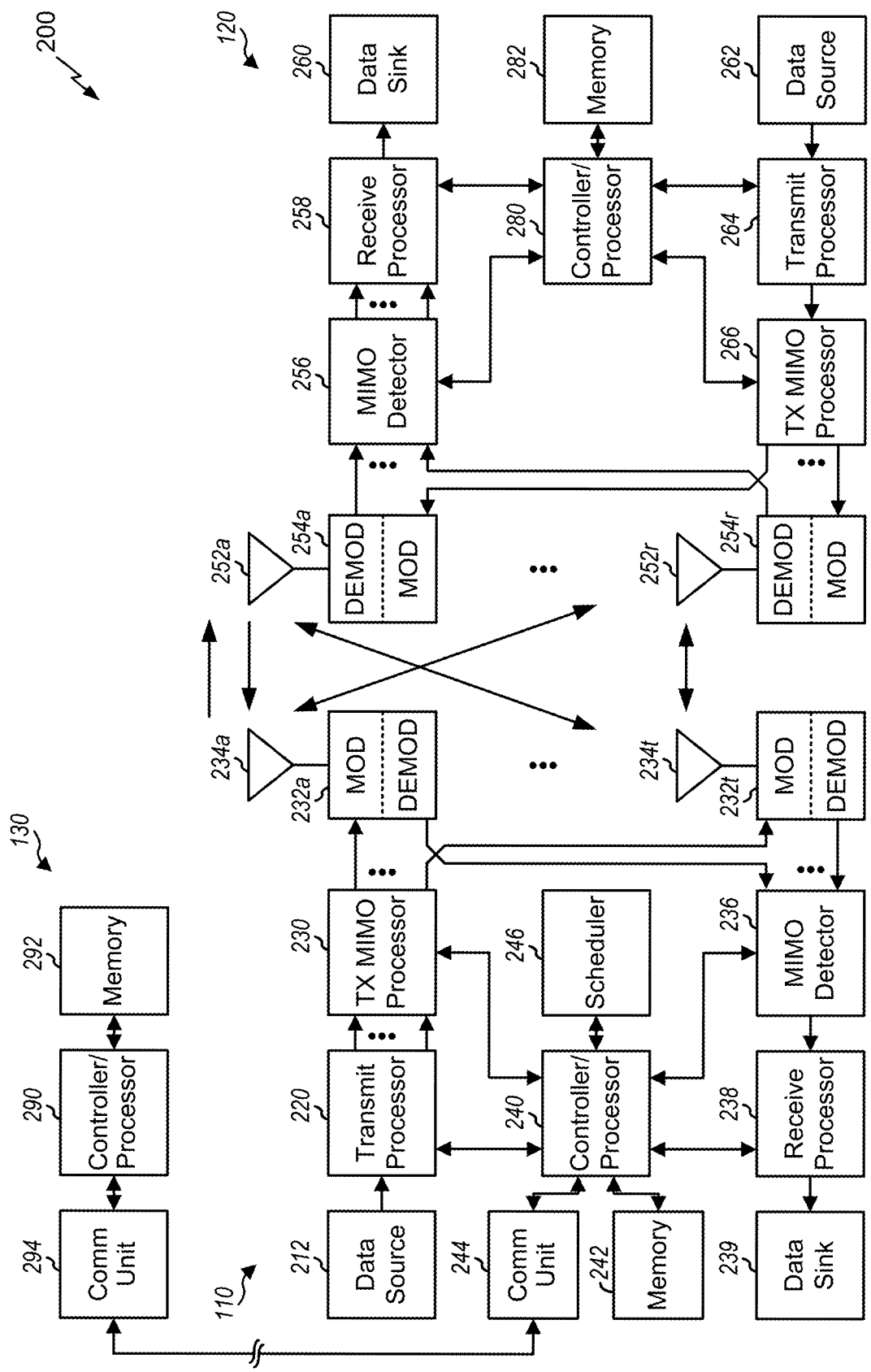
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power or RSRP, received signal strength indicator or RSSI, reference signal received quality or RSRQ, channel quality indicator or CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform sub-PRB resource allocation for MTC. For example, controller/processor 280 and/or other processors and modules at BS 110, may perform or direct operations of UE 120 to perform sub-PRB resource allocation for MTC. For example, controller/processor 280 and/or other controllers/processors and modules at BS 110 may perform or direct operations of, for example, method 600 of FIG. 6, method 700 of FIG. 7, method 800 of FIG. 8, and/or other processes as described herein. In some aspects, one or more of the components shown in FIG. 2 may be employed to perform example method 600 of FIG. 6, example method 700 of FIG. 7, example method 800 of FIG. 8, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
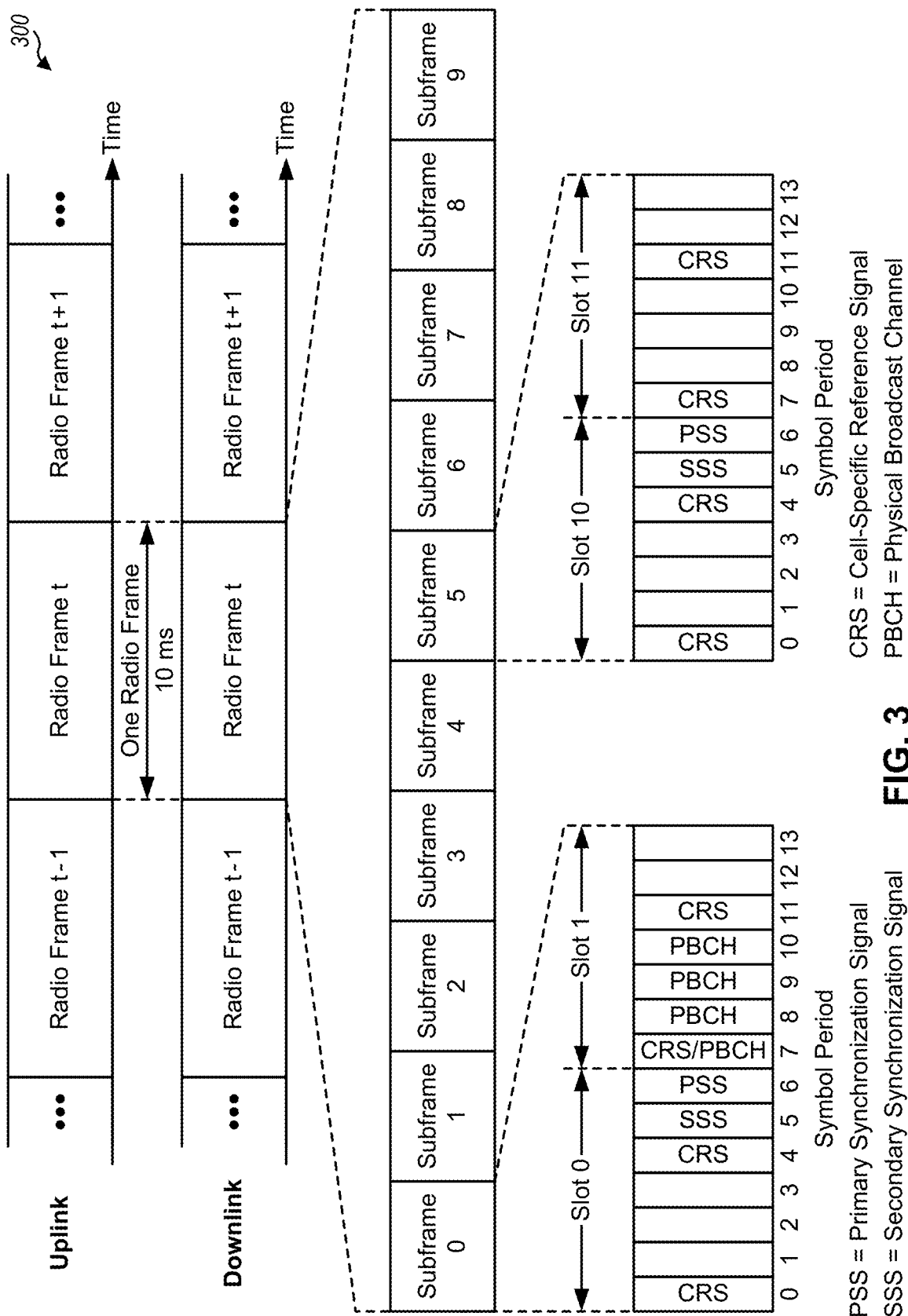
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Machine-type communication (MTC) may be characterized by automatic data generation, exchange, processing, and actuation among machines, without intervention or with low intervention of humans. For example, MTC devices may be used in field deployments of apparatuses that are not monitored or operated by a human. Examples and classifications of MTC devices may include, for example Category M UEs, Category M1 UEs, and Category M2 UEs. The Third Generation Partnership Project (3GPP) has defined various standards and releases prescribing how communications with MTC UEs are handled, such as Enhanced MTC (eMTC) defined by 3GPP Releases 13, 14, and 15, and the NarrowBand Internet of Things (NB-IoT) standard.

Some MTC devices may use smaller resource allocations than typical UEs. For example, an MTC device may not transmit as much data as a typical UE, so the allocation of an entire physical resource block (PRB) (e.g., 7 subcarriers each having 12 symbols, for a total of 84 symbols) for uplink traffic of the MTC device may be wasteful and unnecessary. However, it may not be sufficient to simply allocate less than one PRB for the uplink traffic. For example, certain features of MTC devices, such as frequency hopping, transport block size (TBS) mapping, retuning, and/or the like, may need specialized configuration to function properly with regard to sub-PRB resource allocations.

Some techniques and apparatuses, described herein, provide sub-PRB allocation for eMTC devices. In some aspects, techniques and apparatuses described herein provide dynamic switching between sub-PRB and larger-bandwidth (e.g., greater than or equal to one PRB) allocations, which improves versatility of resource allocation and performance of the network. Additionally, or alternatively, some techniques and apparatuses described herein may provide a limited-flexibility resource allocation technique for sub-PRB allocation, which may reduce a size of a resource allocation field identifying the sub-PRB allocation. Additionally, or alternatively, some techniques and apparatuses described herein may use downlink control information (DCI) bits or MCS entries to indicate resource allocation, which may further reduce a size of the resource allocation field. Some techniques and apparatuses described herein may also provide for frequency hopping for sub-PRB allocations, as well as retuning to decrease puncturing or data loss of sub-PRB allocations. In this way, MTC devices, such as Category M, M1, and M2 UEs or eMTC UEs, may be scheduled with sub-PRB resource allocations while preserving frequency hopping and retuning features, which improves efficiency of resource allocation and performance of MTC devices.

Figure 4:
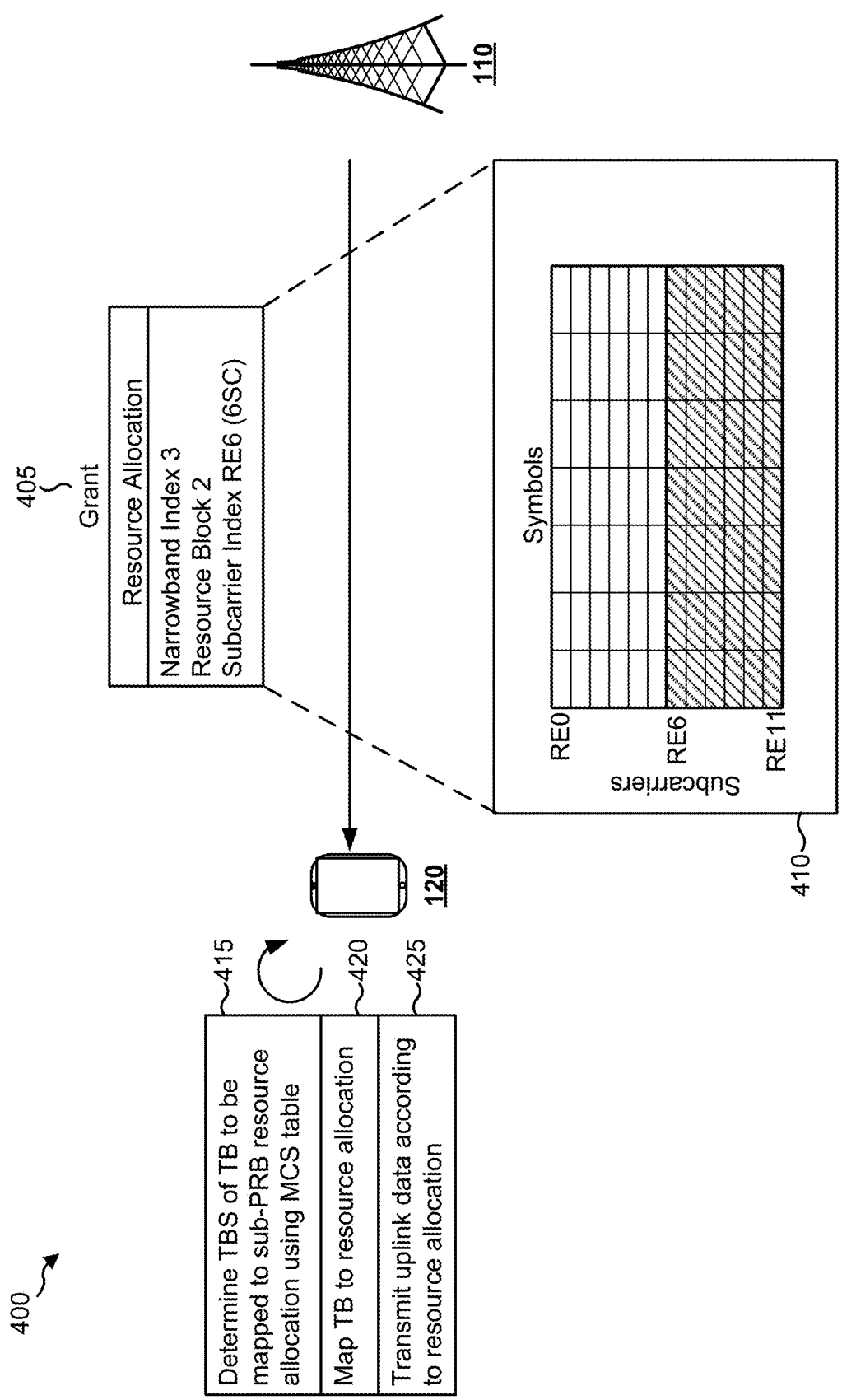
FIG. 4 is a diagram illustrating an example of allocating sub-PRB resource allocations for an MTC UE.

FIG. 4 is a diagram illustrating an example 400 of allocating sub-PRB resource allocations for an MTC UE.

As shown in FIG. 4, and by reference number 405, a UE 120 may receive a grant from a scheduling entity (e.g., a BS 110 and/or the like). The grant may be a grant for a sub-PRB uplink resource allocation, as described in more detail below. In some aspects, the grant may be provided in a physical downlink control channel (PDCCH), such as a PDCCH, an mPDCCH, an ePDCCH, and/or the like. As further shown, the grant may identify an uplink resource allocation for the UE 120. In some aspects, the resource allocation may be formatted based at least in part on a particular format, such as a format specified in 3GPP Release 13 for eMTC or a different format.

In some aspects, the BS 110 may provide the grant based at least in part on the UE 120 being configured to use a sub-PRB resource allocation. For example, the UE 120 may provide a capability report and/or the like indicating that the UE 120 is capable of using, or is configured to use, a sub-PRB resource allocation. In some aspects, the BS 110 may allocate sub-PRB resource allocations for the UE 120 only when the UE 120 is configured to use sub-PRB resource allocations (e.g., irrespective of a system bandwidth of the UE 120).

In some aspects, when the UE 120 is configured for a first maximum transmission bandwidth (e.g., 1.4 MHz associated with up to 6 PRBs), the BS 110 may allocate sub-PRB resource allocations as well as a number of PRBs associated with the first maximum transmission bandwidth (e.g., a sub-PRB resource allocation as well as 1 to 6 PRBs). This may allow reuse of resource allocation states for the sub-PRB resource allocations. In some aspects, when the UE 120 is configured for a second maximum transmission bandwidth (e.g., 5 MHz), the BS 110 may allocate sub-PRB resource allocations as well as a number of PRBs associated with the second maximum transmission bandwidth (e.g., a sub-PRB resource allocation as well as up to 24 PRBs). This may provide the BS 110 with more flexibility in scheduling the UE 120 without requiring radio resource control reconfiguration.

As shown, the uplink resource allocation may identify a narrowband index (e.g., 3). For example, the UE 120 may be configured to communicate on one or more narrowbands which may be associated with respective indexes. The narrowband index may identify a narrowband in which the uplink resource allocation is included. As used herein, a narrowband may refer to a band, channel, or sub-channel on which an MTC UE may communicate. For example, a narrowband may be 200 kHZ, 1.4 MHz (corresponding to 6 resource blocks (RBs)), 5 MHz, or another bandwidth.

In some aspects, the narrowband may be selected from a predefined group of narrowbands. For example, the UE 120 may be configured to use one of the predefined group of narrowbands for uplink transmissions associated with a sub-PRB resource allocation. The BS 110 may select one of the predefined group of narrowbands (e.g., narrowband 3), and may identify a PRB of the selected narrowband to carry the uplink data, as described below.

As further shown, the grant may identify a resource block (e.g., an RB or a PRB). Here, the resource block is identified by an index of 2. In some aspects, the resource block may be identified in another fashion (e.g., implicitly or explicitly). By identifying the resource block, the grant enables the UE 120 to use less than one PRB (e.g., less than all of the PRB identified by the grant) to provide uplink traffic, which improves efficiency of allocation of network resources. In some aspects, the grant may identify more than one PRB. For example, the grant may identify respective portions of two or more PRBs, may identify an entirety of a first PRB and a portion of a second PRB, and/or the like.

In some aspects, the PRB may be selected from a predefined group of PRBs. For example, the UE 120 may be configured to use only one or more of the predefined group of PRBs to carry sub-PRB uplink traffic. In some aspects, the predefined group of PRBs may include fewer than all PRBs of a narrowband on which the UE 120 is configured to communicate (e.g., narrowband 3). Additionally, or alternatively, the selected PRB may be selected based at least in part on the selected PRB being included in a guard band of a narrowband.

In some aspects, the selected PRB may be selected based at least in part on the particular PRB not being included in a narrowband. For example, the selected PRB may be selected from PRBs not included in a Release 13 eMTC narrowband configuration (e.g., the center PRB of a 5 MHz narrowband, one of the two edge PRBs of a 10 MHz narrowband, and/or the like). In some aspects, the selected PRB may be indicated based at least in part on a higher layer configuration.

As further shown, the grant may identify a subcarrier index that indicates which subcarriers of resource block 2 are to be used to transmit uplink data. Here, the subcarrier index identifies resource element 6 and indicates to use 6 subcarriers. For example, and as shown by reference number 410, each PRB may include 12 subcarriers. The grant, in this case, indicates to use the subcarriers associated with indexes 6, 7, 8, 9, 10, and 11 to transmit uplink data. In some aspects, each PRB may correspond to a slot of a subframe. In some aspects, each PRB may correspond to a subframe, or a different length of time.

In some aspects, the group of subcarriers identified by the subcarrier allocation may be selected from multiple, non-overlapped groups of subcarriers. For example, the subcarrier allocation may be selected from non-overlapped 3-subcarrier groups, non-overlapped 6-subcarrier groups, and/or the like. In such a case, the 3-subcarrier groups may start at resource element indexes 0, 3, 6, and 9, and the 6-subcarrier groups may start at resource element indexes 0 and 6.

In some aspects, using a full-flexibility approach (e.g., allocating any number of subcarriers, of any PRB of a narrowband) may increase scheduling flexibility. To reduce a resource allocation bitmapping size, the BS 110 may use a limited flexibility resource allocation approach, in which the BS 110 selects the PRB and/or subcarrier group from a predefined subset of all of the PRBs and/or subcarrier groups (as mentioned above). As an example, the BS 110 may allocate only 3-subcarrier, 6-subcarrier, 12-subcarrier (e.g., one PRB), and 24-subcarrier (e.g., two PRB) resource allocations. In such a case, and assuming that the BS 110 selects the resource allocation from a predefined group of 4 RBs within a narrowband (e.g., 4 of a total of 6 RBs of the narrowband), there may be 31 resource allocation states of the narrowband. Thus, each resource allocation state can be signaled using a 5-bit bitmap, which is the same size as the Coverage Enhancement (CE) Mode A bitmap of Release 13, thereby not requiring an increased bitmap size to provide sub-PRB resource allocations.

In some aspects, one or more additional bits may be added to DCI for the full-flexibility approach. In order to reduce the DCI overhead, the resource allocation for sub-PRB may be jointly coded with other fields, such as the field for indicating repetition level. Since there is a limitation for the maximum number of transmission subframes, (e.g., up to 32 subframes for CE ModeA), the number of repetition level for different numbers of subcarriers may be different. For example, if one resource unit is considered, the supported number of repetition levels for 2-subcarrier, 3-subcarrier and 6-subcarrier are {1, 2, 4}, {1, 2, 4, 8}, and {1, 2, 4, 8, 16}, respectively. This may be because the resource unit (RU) lengths for different number of subcarriers are different, i.e., 8 ms, 4 ms and 2 ms for 2-subcarrier, 3-subcarrier and 6-subcarrier, respectively. An example of supported numbers of repetition levels for other number of RUs is given in the table below. In the case of joint coding of resource allocation and the repetition levels, there may be a total of 504 states (i.e., 6 PRB allocation, 4 values for 2-subcarrier location within the RB, 4 values for 3-subcarrier location within the RB, 2 values for 6-subcarrier location within the RB, 3 values for #RUs={1, 2, 4}, thus (6×4+9×4+12×2)× 6=504), thereby using 9-bits. This may lead to an increase of 2 bits compared to the legacy 7 bits, for which 5 bits are used for resource allocation and 2 bits are used for indicating the repetition levels.

| | The number of repetitions for a given #RU and #subcarriers | | |
|---|---|---|---|
| #RUs | 2-subcarriers | 3-subcarriers | 6-subcarriers |
| 1 | {1, 2, 4} | {1, 2, 4, 8} | {1, 2, 4, 8, 16} |
| 2 | {1, 2} | {1, 2, 4} | {1, 2, 4, 8} |
| 4 | {1} | {1, 2} | {1, 2, 4} |
| Total states | 6 | 9 | 12 |

As shown by reference number 415, the UE 120 may determine a transport block size (TBS) of a transport block (TB) to be mapped to the sub-PRB resource allocation. For example, the sub-PRB resource allocation may identify an MCS index. The UE 120 may refer to an MCS table, based at least in part on the MCS index, to determine a TBS associated with the MCS index. In some aspects, the MCS table may be associated with a particular standard. For example, the MCS table may be associated with the eMTC standard (e.g., which may support QPSK or 16-quadrature amplitude modulation (16-QAM)), the NB-IoT standard (e.g., which may support only QPSK), or another standard. In some aspects, when the UE 120 is configured to use QPSK, and when the UE 120 uses the QPSK TBS table associated with eMTC, the UE 120 may apply a modulation order restriction. For example, if the modulation order is greater than 2, i.e., 16 QAM or greater, then the UE will overwrite the modulation order with QPSK or BPSK associated with the sub-PRB resource allocation.

As shown by reference number 420, the UE 120 may map the TB to the sub-PRB resource allocation based at least in part on the TBS.

In some aspects, the UE 120 may map a single TB to a single resource unit, or the BS 110 may schedule the single TB to be mapped to the single resource unit. As used herein, a resource unit refers to a first number of subcarriers and a second number of subframes, wherein the first number of subcarriers and the second number of subframes are determined based at least in part on a predefined constant. For example, a resource unit may include x subcarriers and y subframes, where x*y equals 12. In such a case, the DCI (e.g., the grant) may signal a number of resource units over which the TB is to be provided (e.g., similar to the N_RU value defined by NB-IoT). In some aspects, when the TBS is determined based at least in part on the eMTC MCS table, the N_RU value identified by the MCS table may be used to identify the number of PRBs to which the TB is to be mapped.

In some aspects, the UE 120 may determine a repetition number for the uplink data transmission associated with the sub-PRB resource allocation. For example, the repetition levels defined by the eMTC standard (e.g., 3GPP Release 13 TS 36.213) may be used as-is, which may reduce a reconfiguration effort of implementing the repetition number. In some aspects, the supported repetition level may be reduced in comparison to Release 13. For example, the supported repetition level may be reduced to permit the repetition field of the DCI to be used to indicate at least part of the uplink resource allocation or the number of resource units to be used. In such a case, the uplink resource allocation may be identified based at least in part on a joint coding with the MCS and repetition levels.

As shown by reference number 425, the UE 120 may transmit uplink data based at least in part on the grant. For example, the UE 120 may map a transport block to the subcarriers associated with the uplink resource allocation based at least in part on a modulation scheme identified by the grant. In this way, the UE 120 communicates using an uplink grant of less than one PRB.

In some aspects, the UE 120 may retune (e.g., perform a retuning operation) to transmit the uplink data. For example, the UE 120 may start at a first frequency, subcarrier, or narrowband, and may need to retune to a frequency, subcarrier, or narrowband associated with the sub-PRB resource allocation. In 3GPP Release 14 of the eMTC standard, OFDM symbols 0, 1, and/or 2 are used for retuning based at least in part on capabilities of a UE. In such a case, when the UE is in 1.4 MHz maximum transmission bandwidth mode, retuning is performed whenever the narrowband changes. When the UE is configured for 5 MHz maximum transmission bandwidth, the rules to determine the number of symbols for retuning are based at least in part on changes of wideband or center frequency of the narrowband. For example, in 3GPP Release 14 TS 36.211, up to four non-overlapping widebands are defined. A center frequency is determined for the resource allocation. When the destination uplink resource allocation is within the same wideband as the starting uplink resource allocation, the center frequency is defined as the center frequency of the same wideband. When the destination uplink resource allocation is in a different wideband as the starting uplink resource allocation, the center frequency is defined as the center frequency of the resource allocation.

In some aspects, the UE 120 may perform retuning according to an approach associated with a maximum transmission bandwidth of the UE 120. For example, the UE 120 may retune when the narrowband of the UE changes when the UE 120 is configured for a 1.4 MHz maximum transmission bandwidth mode, and may retune based at least in part on the Release 14 approach for the 5 MHz maximum transmission bandwidth when the UE 120 is configured for the 5 MHz maximum transmission bandwidth mode. In some aspects, the UE 120 may perform retuning whenever a narrowband of the UE 120 changes. For example, when the UE 120 determines that a destination uplink resource allocation is included in a different narrowband than a starting uplink resource allocation, the UE 120 may retune to the different narrowband. In some aspects, the UE 120 may perform retuning when the destination uplink resource allocation is different than the starting uplink resource allocation.

In some aspects, the UE 120 may determine particular resources to puncture based at least in part on whether the UE 120 is allocated a sub-PRB resource allocation. For example, the UE 120 may determine to puncture a last one or more symbols of a subframe when the last one or more symbols are to be lost (e.g., dropped, not transmitted, etc.) due to the retuning operation. In some aspects, the UE 120 may determine to perform a rate matching operation. For example, the UE 120 may rate match a first one or more symbols of a subframe so that data of the one or more symbols, which would otherwise be lost due to retuning, is provided on the following symbols of the subframe. In some aspects, the UE 120 or BS 110 may determine that a particular symbol is not to be punctured. For example, the fourth symbol of each slot may be associated with a demodulation reference signal (DMRS) and may not be punctured. In some aspects, the UE 120 or BS 110 may determine that a different symbol is not to be punctured.

As indicated above, FIG. 4 is provided as an example. Other examples are possible and may differ from what was described with respect to FIG. 4.

Figure 5:
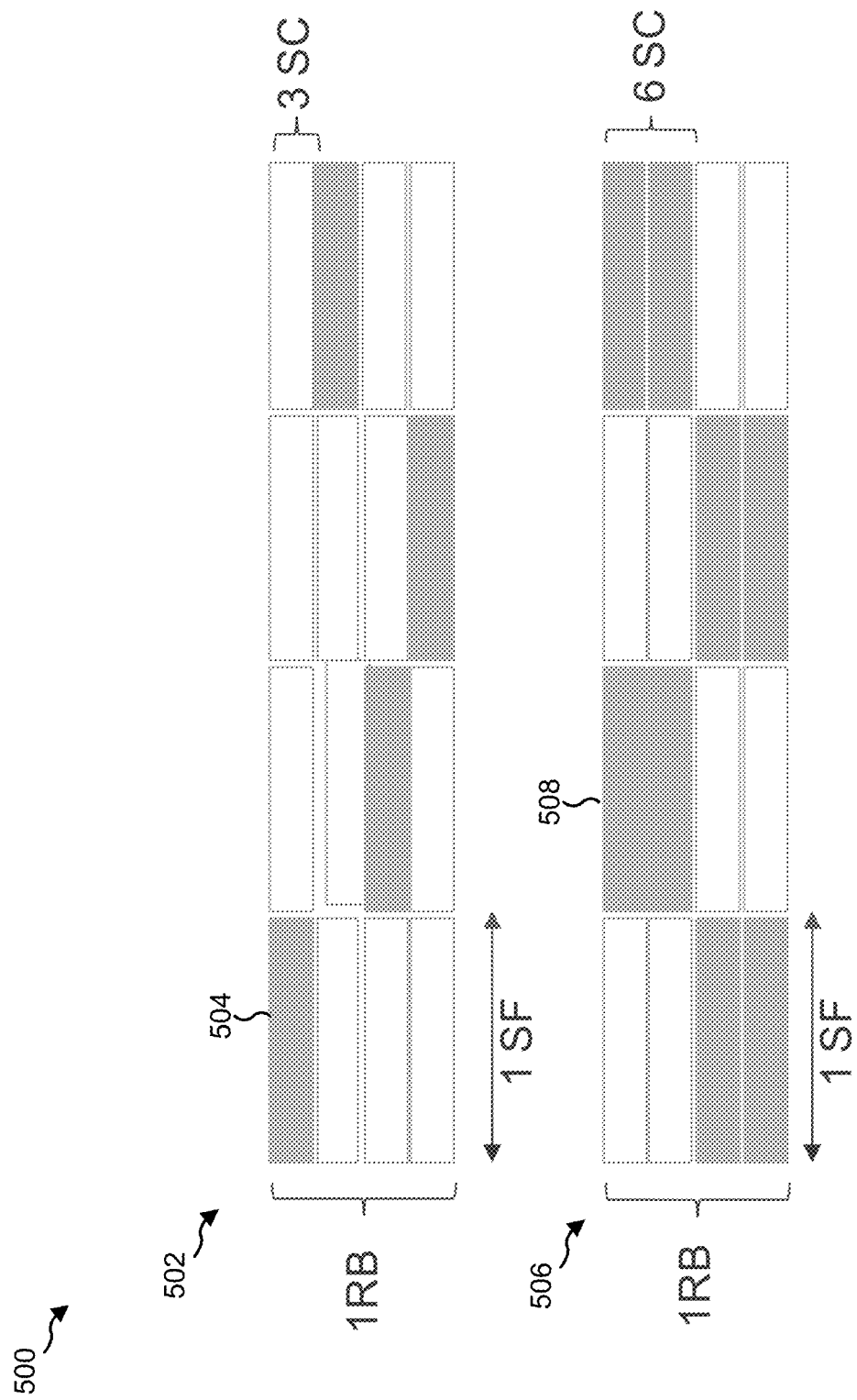
FIG. 5 is a diagram illustrating an example of frequency hopping with regard to sub-PRB resource allocations for an MTC UE.

FIG. 5 is a diagram illustrating an example 500 of frequency hopping with regard to sub-PRB resource allocations for an MTC UE.

In some aspects, a UE 120 may perform frequency hopping to improve transmit diversity of uplink data transmissions of the UE 120. One approach for frequency hopping is defined by TS 36.211 Releases 13 and 14 of 3GPP. When performing a frequency hopping technique, a UE 120 may switch between different groups of subcarriers over time. For example, a frequency hopping interval may be semi-statically configured. In CE Mode A, the frequency hopping technique may be performed on FDD offsets of 1, 2, 4, or 8 frequency bands, and may be performed on time division duplexing (TDD) offsets of 1, 5, 10, or 20 subframes. In CE Mode B, the frequency hopping technique may be performed on FDD offsets of 2, 4, 8, or 16 frequency bands, and may be performed on TDD offsets of 5, 10, 20, or 40 subframes. In such a case, the UE 120 may hop from a first narrowband to a second narrowband that are separated by a particular FDD offset, and may perform the hop based at least in part on a time interval identified by the TDD offset.

In some aspects, when the UE 120 is allocated a sub-PRB uplink resource allocation, frequency hopping may not be allowed, which reduces radio resource control (RRC) signaling. In some aspects, the UE 120 may perform frequency hopping according to the Release 13 or Release 14 process described in the preceding paragraph, which reduces an effort associated with reconfiguring the BS 110 and the UE 120 to facilitate the frequency hopping technique. However, in such a case, the size of a resource unit to which a sub-PRB resource allocation is mapped may not line up with the time offset of the frequency hopping technique, so data may be lost due to retuning.

In some aspects, the UE 120 may configure frequency hopping so that a frequency hopping interval (e.g., a time interval) matches a number of subframes or resource units associated with the uplink resource allocation. In this way, frequency hopping is performed only at the end of an uplink resource allocation or a resource unit of an uplink resource allocation, which reduces loss due to frequency hopping. In some aspects, the UE 120 may configure the frequency hopping technique so that frequency hopping is performed within a set of preconfigured PRBs (e.g., instead of across two narrowbands), which may reduce retuning time associated with the frequency hopping technique.

In some aspects, and as shown in FIG. 5, the UE 120 may perform frequency hopping within a single resource unit. Reference number 502 shows an example of frequency hopping for a 3-subcarrier, 1-subframe resource allocation. The resource allocation is shown by reference number 504. As shown, the frequency hopping is performed within a single resource unit of 4 subframes and 12 subcarriers. As further shown, the frequency hopping is performed at a time interval (e.g., 1 subframe) that matches a length of the uplink resource allocation. In some aspects, the UE 120 may perform a cyclic frequency hopping technique, a mirror frequency hopping technique, or another type of frequency hopping technique within the resource unit. As shown by reference number 506, in some aspects, the UE 120 may perform a cyclic frequency hopping technique. Here, the UE 120 hops between transmitting the uplink transmission (shown by reference number 508) on two sets of 6 subcarriers (e.g., subcarriers 0-5 and 6-11).

As indicated above, FIG. 5 is provided as an example. Other examples are possible and may differ from what was described with respect to FIG. 5.

Figure 6:
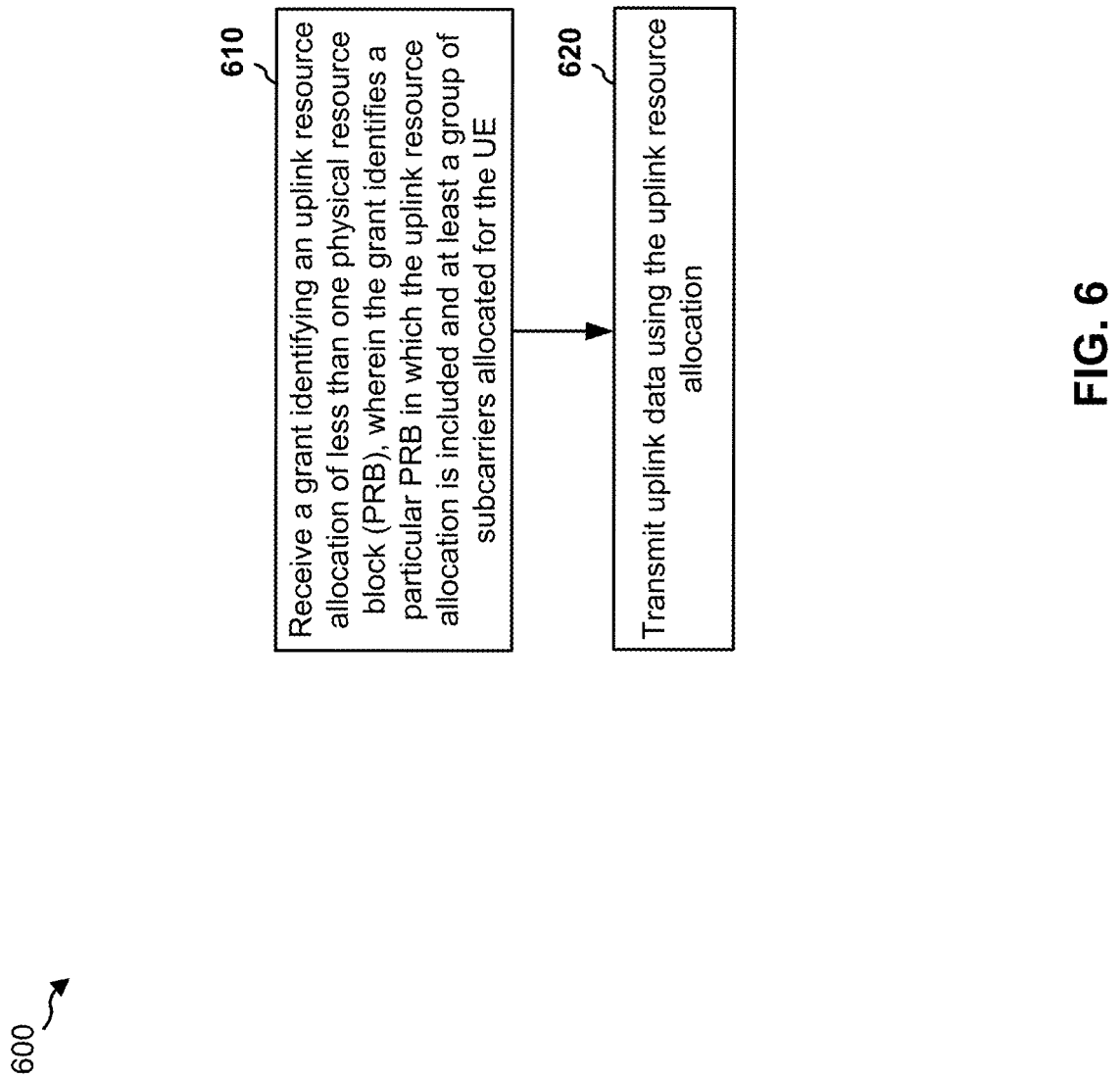
FIG. 6 is a flow chart of a method of wireless communication.

FIG. 6 is a flow chart of a method 600 of wireless communication. The method may be performed by a UE (e.g., the UE 120 of FIG. 1, the apparatus 902/902', and/or the like).

At 610, the UE may receive a grant identifying an uplink resource allocation of less than one physical resource block (PRB), wherein the grant identifies a particular PRB in which the uplink resource allocation is included and at least a group of subcarriers allocated for the UE. For example, the UE may receive a grant (e.g., in DCI, an mPUCCH, and/or the like). The grant may identify an uplink resource allocation of less than one PRB. For example, the grant may identify a particular PRB in which the uplink resource allocation is included, and may identify at least a group of subcarriers (e.g., 3 subcarriers, 6 subcarriers, 8 subcarriers, 12 subcarriers, 24 subcarriers, and/or the like) allocated for the UE. In some aspects, the uplink resource allocation may include more than one PRB, or may be distributed over more than one PRB, as described in more detail elsewhere herein.

At 620, the UE may transmit uplink data using the uplink resource allocation. For example, the UE may transmit data using the uplink resource allocation. In some aspects, the UE may perform a frequency hopping technique to improve frequency diversity, as described in connection with FIG. 7 below. Additionally, or alternatively, the UE may perform a retuning operation based at least in part on the uplink resource allocation, as described in connection with FIG. 8, below. For example, the UE may retune from an original frequency to a frequency associated with the uplink resource allocation.

In some aspects, the UE includes a Category M UE, a Category M1 UE, or a Category M2 UE. In some aspects, the particular PRB is selected from a predefined narrowband configured for the UE using radio resource control signaling. In some aspects, the uplink resource allocation further identifies a narrowband in which the particular PRB is included. In some aspects, the narrowband is selected from a predefined group of narrowbands that includes fewer than all narrowbands corresponding to a system bandwidth of the UE. In some aspects, the particular PRB is selected from a predefined group of PRBs that includes fewer than all PRBs of a narrrowband on which the UE is configured to communicate.

In some aspects, the particular PRB is selected based at least in part on the particular PRB being not included in a narrowband. In some aspects, the particular PRB is selected based at least in part on the particular PRB being included in a guard band. In some aspects, the uplink resource allocation is identified using one or more unused bits of downlink control information. In some aspects, the uplink resource allocation is identified based at least in part on a joint coding with an MCS and repetition level identified by downlink control information associated with the grant. In some aspects, the uplink resource allocation is associated with a transport block, and the uplink resource allocation maps the transport block to at least one resource unit that includes a first number of subcarriers and a second number of subframes, and the grant indicates a number of resource units to which the transport block is to be mapped.

In some aspects, a transport block size (TBS) of the transport block is determined based at least in part on the number of resource units. In some aspects, a modulation order of the transport block is overwritten with quadrature phase shift keying or binary phase shift keying when a determined modulation order of the transport block is greater than 2. In some aspects, the uplink resource allocation is associated with a transport block, the uplink resource allocation maps the transport block to a resource unit that includes a first number of subcarriers and a second number of subframes, and the grant indicates a number of resource units to which a transport block, associated with the uplink resource allocation, is to be mapped. In some aspects, a transport block size of the at least one transport block is determined based at least in part on the number of resource units by using a TBS table associated with narrowband Internet of Things (NB-IoT). In some aspects, the table is associated with a 16-quadrature amplitude modulation scheme, and the transport block size of the at least one transport block is determined by increasing a transport block size identified by the table.

In some aspects, the group of subcarriers is selected from multiple non-overlapping groups of subcarriers of the particular PRB. In some aspects, the UE is configured to receive a resource allocation that is less than one PRB, and uplink data communications are scheduled using the grant of less than one PRB resource allocation. In some aspects, the grant is a first grant of less than one PRB and the UE is configured with a maximum transmission bandwidth, and the UE is further configured to receive a second grant of at least one PRB, wherein a number of PRBs of the second grant is based at least on the maximum transmission bandwidth. In some aspects, the maximum transmission bandwidth is 1.4 megahertz and the second grant is associated with from one to six PRBs. In some aspects, the maximum transmission bandwidth is 5 MHz and the second grant is associated with more than six PRBs.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
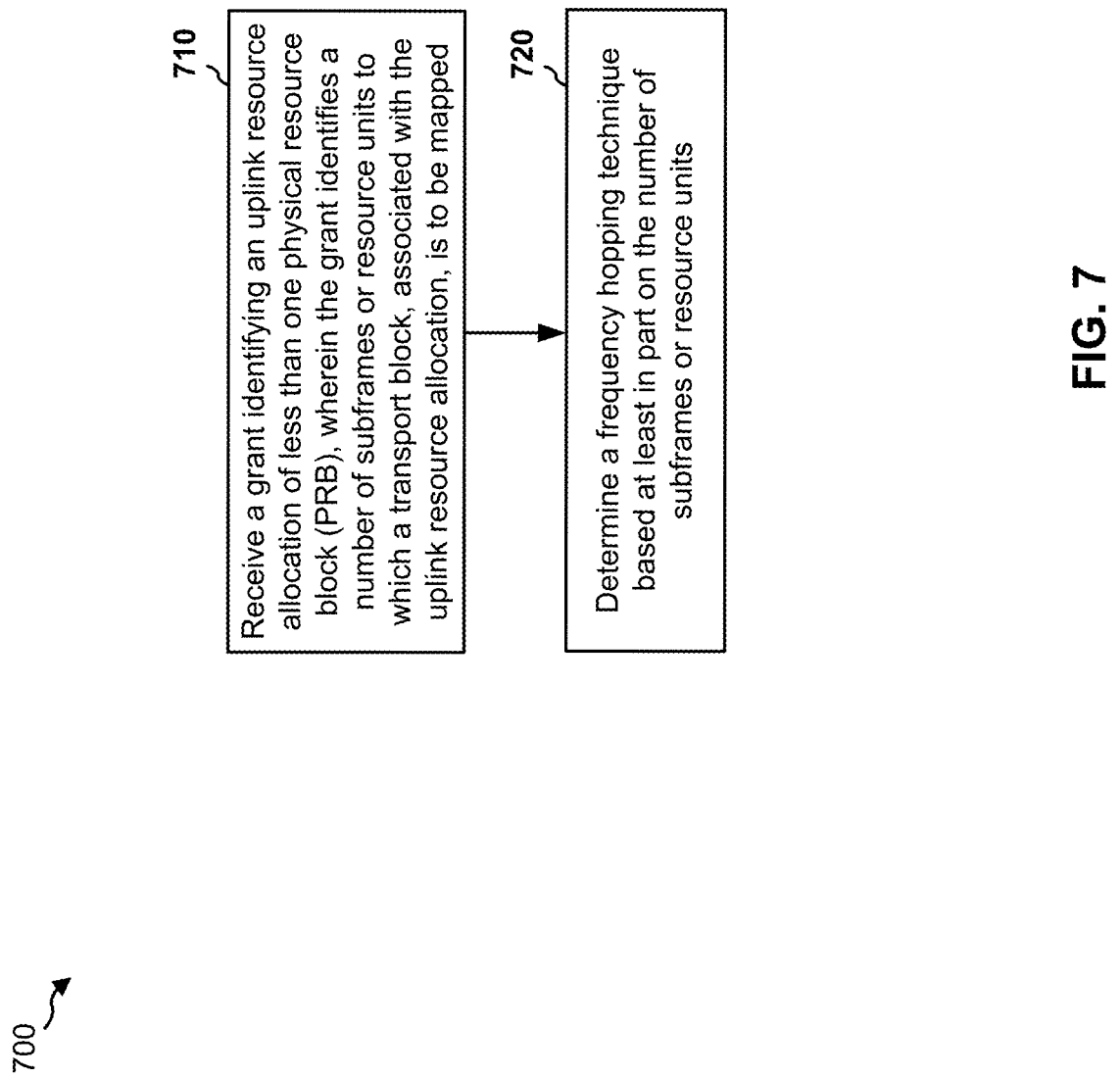
FIG. 7 is another flow chart of a method of wireless communication.

FIG. 7 is another flow chart of a method 700 of wireless communication. The method may be performed by a UE (e.g., the UE 120 of FIG. 1, the apparatus 902/902', and/or the like).

At 710, the UE may receive a grant identifying an uplink resource allocation of less than one physical resource block (PRB), wherein the grant identifies a number of subframes or resource units to which a transport block, associated with the uplink resource allocation, is to be mapped. For example, the UE may receive a grant (e.g., in DCI, an mPUCCH, and/or the like). The grant may identify an uplink resource allocation. Additionally, or alternatively, the grant may identify a number of subframes or resource units to which a TB associated with the uplink resource allocation is to be mapped. For example, the grant may identify a number of subframes (and/or subcarriers) or a resource unit (e.g., a number of subframes and a number of subcarriers that are determined based at least in part on a predetermined value). The UE may map the transport block to the uplink resource allocation based at least in part on the number of subframes or the resource unit.

At 720, the UE may determine a frequency hopping technique based at least in part on the number of subframes or resource units. For example, the UE may determine a frequency hopping technique based at least in part on the number of subframes or resource units. The frequency hopping technique may include, for example, a cyclic technique, a mirror technique, a technique of switching between PRBs, and/or the like.

In some aspects, the UE is configured to deactivate the frequency hopping technique when the grant identifies an uplink resource allocation of less than one PRB. In some aspects, the UE is configured to configure the frequency hopping technique based at least in part on a coverage enhancement mode, a frequency hopping interval, and the number of subframe or resource units when the grant identifies an uplink resource allocation of less than one PRB. In some aspects, the UE is configured to perform the frequency hopping technique when the frequency hopping interval matches the number of subframes or resource units associated with the uplink resource allocation. In some aspects, the UE is configured to perform the frequency hopping technique within one or more predefined PRBs when the grant identifies an uplink resource allocation of less than one PRB. In some aspects, the UE is configured to perform the frequency hopping technique within a particular PRB, wherein the frequency hopping technique is based at least in part on a cyclic approach within the particular PRB. In some aspects, configuration of the frequency hopping technique is indicated using downlink control information or radio resource control signaling.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
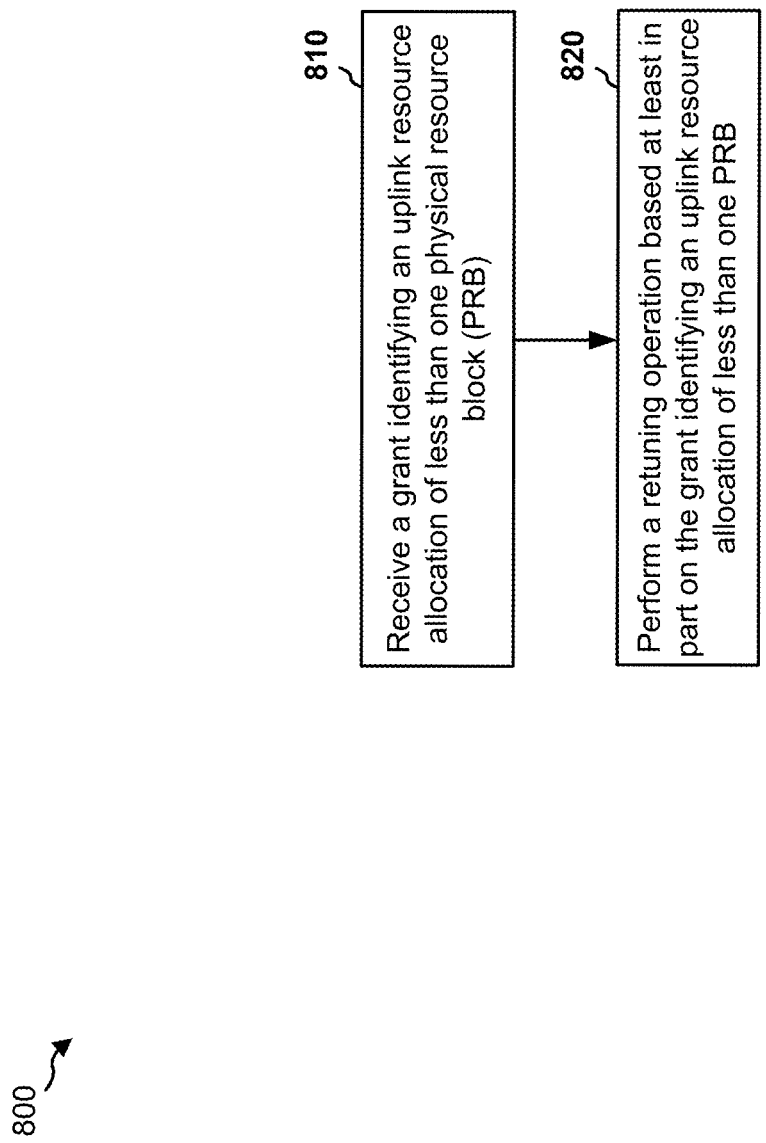
FIG. 8 is another flow chart of a method of wireless communication.

FIG. 8 is another flow chart of a method 800 of wireless communication. The method may be performed by a UE (e.g., the UE 120 of FIG. 1, the apparatus 902/902', and/or the like).

At 810, the UE may receive a grant identifying an uplink resource allocation of less than one physical resource block (PRB). For example, the UE may receive a grant identify an uplink resource allocation, as described in more detail in connection with block 610 of FIG. 6 and block 710 of FIG. 7, above.

At 820, the UE may perform a retuning operation based at least in part on the grant identifying an uplink resource allocation of less than one PRB. For example, the UE may perform a retuning operation in order to transmit data on the uplink resource allocation. In some aspects, the UE may perform the retuning operation according to a configuration associated with Release 13 of the 3GPP standard, as described in more detail elsewhere herein. In some aspects, the UE may perform the retuning operation based at least in part on another approach, such as based at least in part on the grant identifying an uplink resource allocation of less than one PRB.

In some aspects, the UE is configured to perform the retuning operation according to a retuning configuration corresponding to a system bandwidth capability of the UE. In some aspects, the UE is configured to perform the retuning operation when a narrowband on which the UE communicates changes. In some aspects, the UE is configured to perform the retuning operation when a PRB on which the UE communicates changes. In some aspects, the UE is configured to puncture a last one or more symbols of the subframe based at least in part on performing the retuning operation. In some aspects, the UE is configured to rate match a first one or more symbols of the subframe based at least in part on performing the retuning operation.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
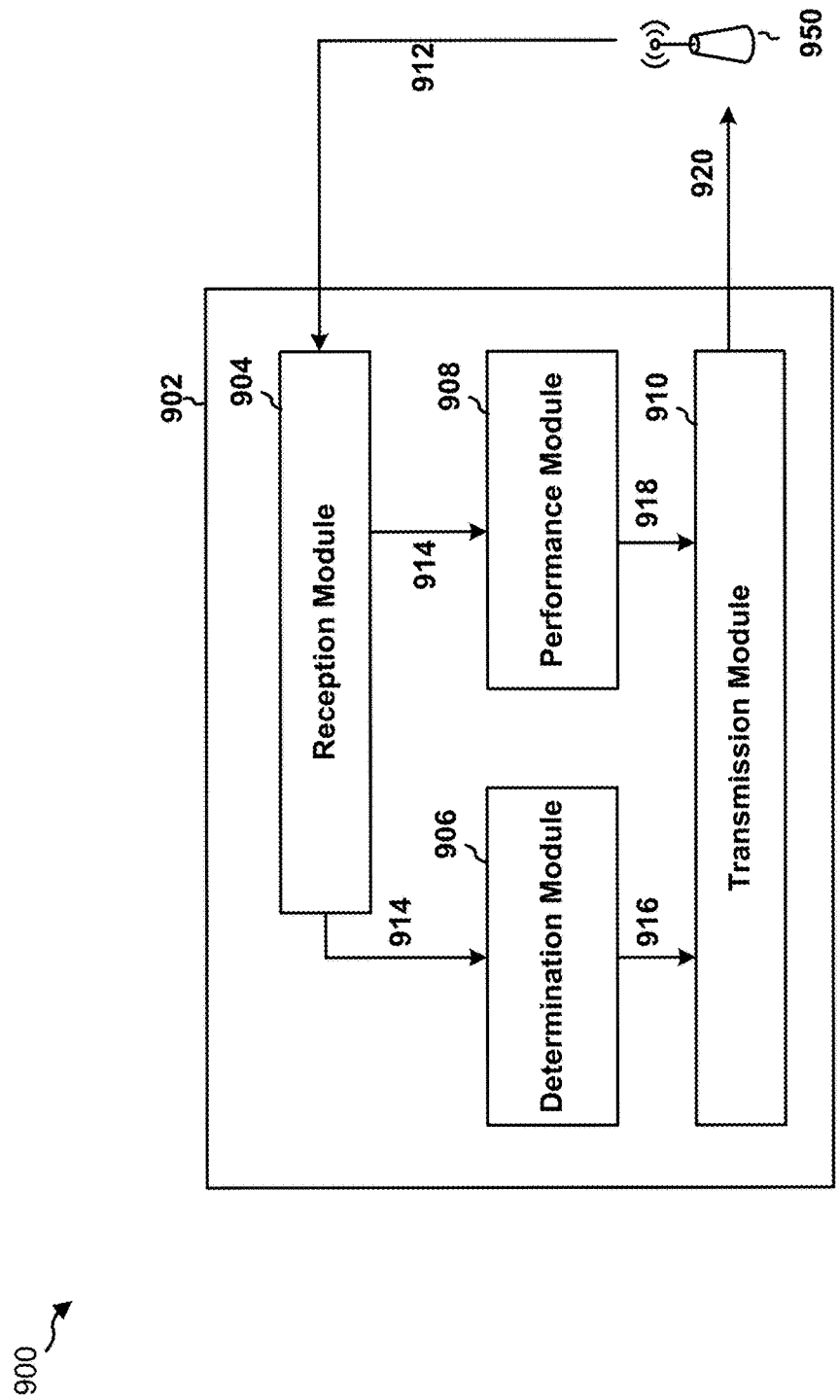
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a UE (e.g., the UE 120). In some aspects, the apparatus 902 includes a reception module 904, a determination module 906, a performance module 908, and/or a transmission module 910.

The reception module 904 may receive data 912 from a base station 950 (e.g., the BS 110 and/or the like). The data 912 may include, for example, a grant identifying an uplink resource allocation of less than one PRB. The reception module 904 may provide data 914 to the determination module based at least in part on the data 914. For example, the reception module 904 may decode the data 912 to obtain the data 914. The data 914 may identify the grant, a PRB of an uplink resource allocation of the grant, a group of subcarriers of the uplink resource allocation, a narrowband associated with the uplink resource allocation, and/or the like.

The determination module 906 may determine a frequency hopping technique based at least in part on the data 914. For example, the frequency hopping technique may include a cyclical technique, a mirror hopping technique, a frequency hopping technique contained within a single narrowband or PRB, and/or the like. The determination module 906 may provide data 916 to the transmission module 910 to implement the frequency hopping technique.

The performance module 908 may perform a retuning operation based at least in part on the grant associated with the data 914. For example, the performance module 908 may perform the retuning operation when a narrowband on which the UE communicates changes based at least in part on the grant, when a PRB on which the UE communicates changes based at least in part on the grant, and/or the like. The performance module 908 may provide data 918 to the transmission module 910 to implement the retuning operation.

The transmission module 910 may transmit uplink data 920 using the uplink resource allocation identified by the grant. In some aspects, the transmission module 910 may implement a retuning operation and/or a frequency hopping technique based at least in part on the data 916 and/or data 918.

The apparatus may include additional modules that perform each of the blocks of the algorithm in the aforementioned flow charts of FIGS. 6, 7, and/or 8. As such, each block in the aforementioned flow charts of FIGS. 6, 7, and/or 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
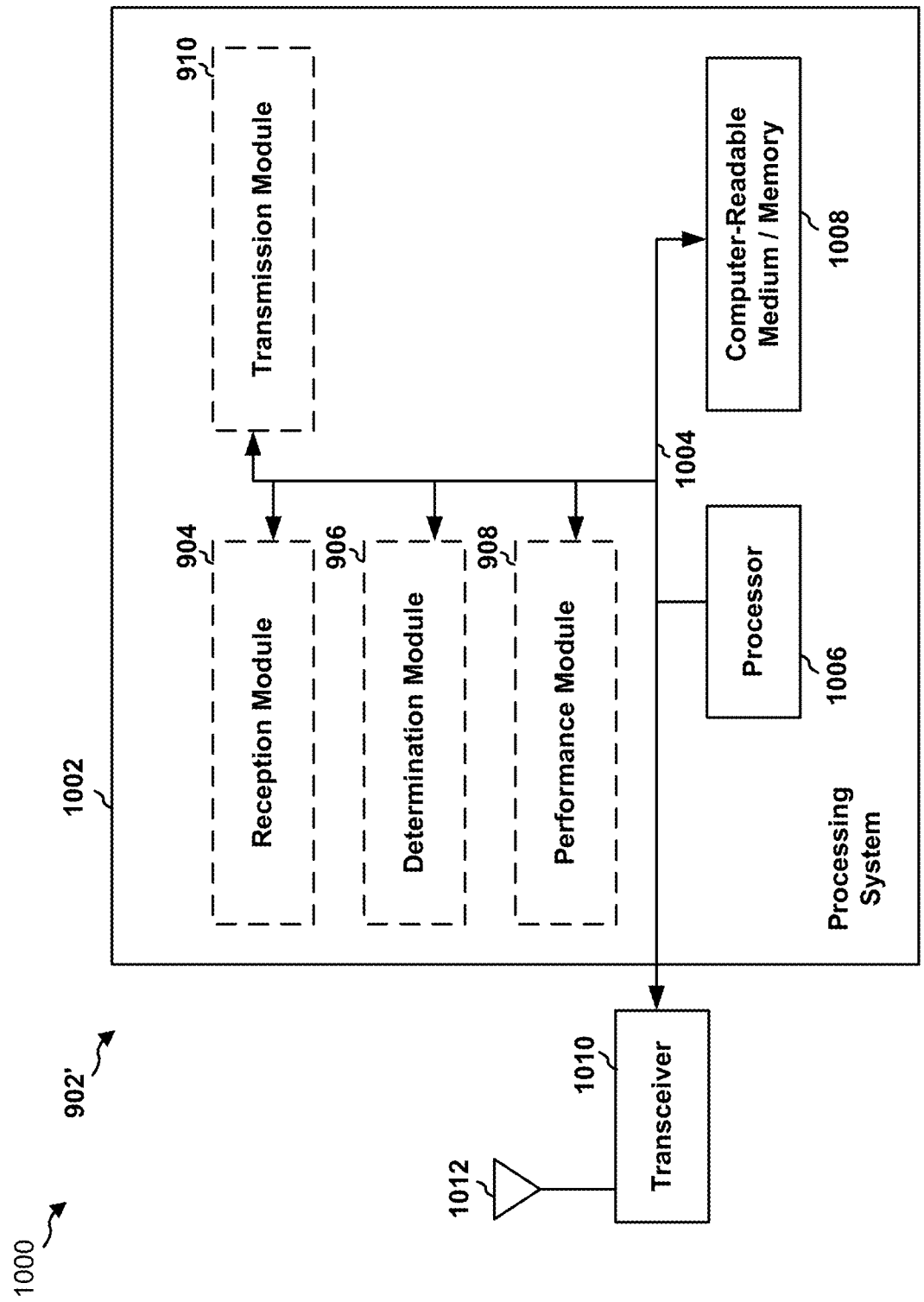
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE (e.g., the UE 120).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, and 910, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, and 910. The modules may be software modules running in the processor 1006, resident/stored in the computer readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving a grant identifying an uplink resource allocation of less than one physical resource block (PRB); means for transmitting uplink data using the uplink resource allocation; means for determining a frequency hopping technique based at least in part on a number of subframes or resource units; and/or means for performing a retuning operation based at least in part on the grant identifying an uplink resource allocation of less than one PRB. The aforementioned means may be one or more of the aforementioned modules of the apparatus 902 and/or the processing system 1002 of the apparatus 902' configured to perform the functions recited by the aforementioned means. As described supra, the processing system 1002 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 10 is provided as an example. Other examples are possible and may differ from what was described in connection with FIG. 10.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a user equipment (UE) capable of using a sub-physical resource block (PRB) resource allocation and a resource allocation of one or more PRBs, a grant identifying an uplink resource allocation of less than one PRB,
wherein the grant identifies a particular PRB in which the uplink resource allocation is included and at least a group of subcarriers allocated for the UE,
wherein the uplink resource allocation is associated with a transport block,
wherein the uplink resource allocation maps the transport block to at least one resource unit that includes a first number of subcarriers and a second number of subframes, and
wherein the grant indicates a number of resource units to which the transport block is to be mapped; and
transmitting uplink data, by the UE, using the uplink resource allocation.

2. The method of claim 1, wherein the UE includes a Category M UE, a Category M1 UE, or a Category M2 UE.

3. The method of claim 1, wherein the uplink resource allocation further identifies a narrowband in which the particular PRB is included.

4. The method of claim 1, wherein the particular PRB is selected from a predefined group of PRBs that includes fewer than all PRBs of a narrowband on which the UE is configured to communicate.

5. The method of claim 4, wherein a configuration of the predefined group of PRBs is indicated using radio resource control signaling.

6. The method of claim 1, wherein the particular PRB is selected based at least in part on the particular PRB being not included in a narrowband.

7. The method of claim 1, wherein the particular PRB is selected based at least in part on the particular PRB being included in a guard band.

8. The method of claim 1, wherein the uplink resource allocation is identified based at least in part on a joint coding with a repetition level associated with the grant.

9. The method of claim 1, wherein a transport block size of the transport block is determined based at least in part on the number of resource units.

10. The method of claim 9, wherein a modulation order of the transport block is overwritten with quadrature phase shift keying or binary phase shift keying when a determined modulation order of the transport block is greater than 2.

11. The method of claim 1, wherein the group of subcarriers is selected from multiple non-overlapping groups of subcarriers of the particular PRB.

12. The method of claim 1, wherein the UE is further configured to receive a second grant of at least one PRB, and wherein a number of PRBs of the second grant is based at least in part on a maximum transmission bandwidth of the UE.

13. The method of claim 12, wherein the maximum transmission bandwidth is 1.4 megahertz and the second grant is associated with from one to six PRBs.

14. The method of claim 12, wherein the maximum transmission bandwidth is 5 megahertz and the second grant is associated with from one to 24 PRBs.

15. A method of wireless communication, comprising:
receiving, by a user equipment (UE), a grant identifying an uplink resource allocation of less than one physical resource block (PRB),
wherein the grant identifies a number of subframes or resource units to which a transport block, associated with the uplink resource allocation, is to be mapped; and
determining, by the UE, a frequency hopping technique based at least in part on the number of subframes or resource units,
wherein the frequency hopping technique is within a narrowband that contains the uplink resource allocation, and
wherein at least one of:
the UE is configured to deactivate the frequency hopping technique when the grant identifies the uplink resource allocation of less than one PRB,
the UE is configured to configure the frequency hopping technique based at least in part on a coverage extension mode, a frequency hopping interval, and the number of subframes or resource units when the grant identifies the uplink resource allocation of less than one PRB,
the UE is configured to perform the frequency hopping technique within one or more predefined PRBs when the grant identifies the uplink resource allocation of less than one PRB, or
the UE is configured to perform the frequency hopping technique within a particular PRB, the frequency hopping technique is based at least in part on a cyclic approach within the particular PRB.

16. The method of claim 15, wherein the UE is configured to deactivate the frequency hopping technique when the grant identifies the uplink resource allocation of less than one PRB.

17. The method of claim 15, wherein the UE is configured to configure the frequency hopping technique based at least in part on the coverage extension mode, the frequency hopping interval, and the number of subframes or resource units when the grant identifies the uplink resource allocation of less than one PRB.

18. The method of claim 17, wherein the UE is configured to perform the frequency hopping technique when the frequency hopping interval matches the number of subframes or resource units associated with the uplink resource allocation.

19. The method of claim 15, wherein the UE is configured to perform the frequency hopping technique within the one or more predefined PRBs when the grant identifies the uplink resource allocation of less than one PRB.

20. The method of claim 15, wherein the UE is configured to perform the frequency hopping technique within the particular PRB, and wherein the frequency hopping technique is based at least in part on the cyclic approach within the particular PRB.

21. A method of wireless communication, comprising:
receiving, by a user equipment (UE), a grant identifying an uplink resource allocation of less than one physical resource block (PRB); and
performing, by the UE, a retuning operation based at least in part on the grant identifying an uplink resource allocation of less than one PRB,
wherein the retuning operation is performed according to a retuning configuration corresponding to a system bandwidth capability of the UE, and
wherein at least one of:
the UE is configured to perform the retuning operation when a narrowband on which the UE communicates changes,
the UE is configured to perform the retuning operation when a PRB on which the UE communicates changes,
the UE is configured to puncture a last one or more symbols of a subframe based at least in part on performing the retuning operation, or
the UE is configured to rate match a first one or more symbols of the subframe based at least in part on performing the retuning operation.

22. The method of claim 21, wherein the UE is configured to perform the retuning operation when the narrowband on which the UE communicates changes.

23. The method of claim 21, wherein the UE is configured to perform the retuning operation when the PRB on which the UE communicates changes.

24. The method of claim 21, wherein the UE is configured to puncture the last one or more symbols of the subframe based at least in part on performing the retuning operation.

25. The method of claim 21, wherein the UE is configured to rate match the first one or more symbols of the subframe based at least in part on performing the retuning operation.

26. A user equipment (UE) for wireless communication, comprising:
a memory; and
one or more processors operatively coupled to the memory, the memory and the one or more processors configured to:
receive a grant identifying an uplink resource allocation of less than one physical resource block (PRB),
wherein the grant identifies a particular PRB in which the uplink resource allocation is included and at least a group of subcarriers is allocated for the UE,
wherein the uplink resource allocation is associated with a transport block,
wherein the uplink resource allocation maps the transport block to at least one resource unit that includes a first number of subcarriers and a second number of subframes, and
wherein the grant indicates a number of resource units to which the transport block is to be mapped; and
transmit uplink data using the uplink resource allocation.

27. The UE of claim 26, wherein the uplink resource allocation further identifies a narrowband in which the particular PRB is included.

28. The UE of claim 26, wherein the particular PRB is selected from a predefined group of PRBs that includes fewer than all PRBs of a narrowband on which the UE is configured to communicate.

29. The UE of claim 28, wherein a configuration of the predefined group of PRBs is indicated using radio resource control signaling.

30. The UE of claim 26, wherein a transport block size of the transport block is determined based at least in part on the number of resource units.

* * * * *